(12) United States Patent
Kondo et al.

(10) Patent No.: US 8,029,760 B2
(45) Date of Patent: Oct. 4, 2011

(54) METHOD OF MANUFACTURING CARBON NANOTUBE

(75) Inventors: Daiyu Kondo, Kawasaki (JP); Akio Kawabata, Kawasaki (JP); Shintaro Sato, Kawasaki (JP); Taisuke Iwai, Kawasaki (JP); Mizuhisa Nihei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/240,238

(22) Filed: Sep. 29, 2008

(65) Prior Publication Data
US 2009/0035209 A1 Feb. 5, 2009

Related U.S. Application Data

(63) Continuation of application No. PCT/JP2006/306628, filed on Mar. 30, 2006.

(51) Int. Cl.
*D01F 9/12* (2006.01)
*D01F 9/127* (2006.01)

(52) U.S. Cl. .......... 423/447.3; 423/447.1; 977/742; 977/750; 977/752; 977/842; 977/843

(58) Field of Classification Search .... 423/447.1–447.9; 977/742, 750, 752, 842, 843
See application file for complete search history.

(56) References Cited

U.S. PATENT DOCUMENTS

| 5,863,601 | A | 1/1999 | Kikuchi et al. | |
|---|---|---|---|---|
| 2003/0148086 | A1* | 8/2003 | Pfefferle et al. | 428/293.7 |
| 2005/0106093 | A1* | 5/2005 | Iijima et al. | 423/447.1 |
| 2005/0164132 | A1 | 7/2005 | Moll et al. | |
| 2006/0205105 | A1 | 9/2006 | Maruyama | |
| 2006/0212974 | A1* | 9/2006 | Kawabata et al. | 977/742 |
| 2006/0216221 | A1* | 9/2006 | Lee | 423/447.3 |
| 2006/0240974 | A1* | 10/2006 | Hongo | 502/60 |
| 2006/0269468 | A1* | 11/2006 | Chung et al. | 423/447.3 |

FOREIGN PATENT DOCUMENTS

| JP | 9-31757 A | 2/1997 |
|---|---|---|
| JP | 11-11917 A | 1/1999 |
| JP | 2004-51432 A | 2/2004 |

(Continued)

OTHER PUBLICATIONS

Cheung et al., Diameter-Controlled Synthesis of Carbon Nanotubes, 2002, J. Phys. Chem. B, 106, pp. 2429-2433.* Zhang et al., Ultra-high-yield growth of vertical single-walled carbon nanotubes: hidden roles of hydrogen and oxygen, Nov. 8, 2005, PNAS, vol. 102, No. 45, pp. 16141-16145.*

R. Y. Zhang et al., "Chemical Vapor Deposition of Single-Walled Carbon Nanotubes Using Ultrathin Ni/Al Film as Catalyst", Nano Letters, 2003, pp. 731-735, vol. 3, No. 6.

(Continued)

*Primary Examiner* — Jerry A Lorengo
*Assistant Examiner* — Jared Wood
(74) *Attorney, Agent, or Firm* — Westerman, Hattori, Daniels & Adrian, LLP (57) ABSTRACT

According to a method of manufacturing carbon nanotubes, minute concavities and convexities are formed at a surface of a substrate, a catalyst metal layer having a predetermined film thickness is formed on the surface having the concavities and convexities, the substrate is subject to a heat treatment at a predetermined temperature to change the catalyst metal layer into a plurality of isolated fine particles. The catalyst metal fine particles have a uniform particle diameter and uniform distribution. Then, the substrate supporting the plurality of fine particles is placed in a carbon-containing gas atmosphere to grow carbon nanotubes on the catalyst metal fine particles by a CVD method using the carbon-containing gas. The carbon nanotubes can be formed to have a desired diameter and a desired shell number with superior reproducibility.

13 Claims, 8 Drawing Sheets

FOREIGN PATENT DOCUMENTS

| | | |
|---|---|---|
| JP | 2004-67413 A | 3/2004 |
| JP | 2004-171903 A | 6/2004 |
| JP | 2004-182537 A | 7/2004 |
| JP | 2004-359478 A | 12/2004 |
| JP | 2005-59167 A | 3/2005 |
| JP | 2005-212093 A | 8/2005 |
| WO | 02063693 A1 | 8/2002 |

OTHER PUBLICATIONS

S. Sato et al., "Growth of diameter-controlled carbon nanotubes using monodisperse nickel nanoparticles obtained with a different mobility analyzer", Chemical Physics Letters, 2003, pp. 361-366, vol. 382.

International Search Report of PCT/JP2006/306628, Mailing date of Jul. 18, 2006.

* cited by examiner

FIG.8

METHOD OF MANUFACTURING CARBON NANOTUBE

CROSS REFERENCE TO RELATED APPLICATIONS

This application is a continuation of International Application No. PCT/JP2006/306628, filed on Mar. 30, 2006, now pending, herein incorporated by reference.

FIELD

The present invention relates to a method of manufacturing carbon nanotubes.

BACKGROUND

Electronic elements using carbon nanotubes have been studied intensely. A carbon nanotube has a basic structure in which a graphene sheet having a hexagonal mesh-like structure of a carbon atom is rolled to have a cylindrical shape. When carbon nanotubes are miniaturized to be single-walled carbon nanotubes (SWNT) or double-walled carbon nanotubes (DWNT), the carbon nanotubes have metallic electric characteristics or semiconducting electric characteristics depending on a difference in the diameter or chirality. The carbon nanotubes having the respective electric characteristics are expected to be used for electronic devices. Although carbon nanotubes are still in the research phase, various examples of applications of carbon nanotubes to electronic devices have been reported.

For example, WO 02/063693A1 suggests a structure of an electrode electrically connected to multi-walled carbon nanotubes. According to this structure, the carbon nanotubes are cut just before the formation of the electrode, metal that is strongly chemically-bound to a carbon atom is formed on the cut carbon nanotube to form the electrode. This reduces the contact resistance between the electrode and the carbon nanotubes in order to realize the application to an electronic device.

Japanese Patent Laid-Open Publication No. 2004-171903 suggests a field-effect transistor structured in which a metallic inner layer of double-walled carbon nanotubes functions as a gate electrode and a semiconducting outer layer functions as a channel. The Japanese Patent Laid-Open Publication No. 2004-171903 also discloses a field-effect transistor, as a prior art, in which a semiconducting inner layer of double-walled carbon nanotubes functions as a channel region and a metallic outer layer functions as a gate electrode.

As described above, the application of carbon nanotubes to electronic devices has been reported. However, only a few methods have been reported to manufacture single-walled or double-walled carbon nanotubes having a semiconducting property with superior reproducibility.

For example, Japanese Patent Laid-Open Publication No. 2004-182537 discloses the generation of a carbon nanotube having a desired diameter by forming minute projections at the surface of a silicon substrate to coat catalyst metal only on the tip ends of the projections.

Chemical Physics Letter 382 (2003)361 discloses that laser light is emitted to catalyst metal required for the formation of a carbon nanotube to gasificate the catalyst metal to fall and accumulate the gasificated catalyst metal on the substrate via gas stream to support the fine particle-like catalyst metal by the surface of the substrate. According to this method, fine particles of catalyst metal having a desired diameter can be generated. The use of such catalyst metal to grow carbon nanotubes can realize the manufacture of a carbon nanotube having a desired diameter or shell number.

SUMMARY

According to an aspect of the present invention is a method of manufacturing carbon nanotubes, having: a first step of forming minute concavities and convexities at a surface of a substrate; a second step of forming a catalyst metal layer having a predetermined film thickness on the surface having the concavities and convexities; a third step of subjecting the substrate to a heat treatment at a predetermined temperature to change the catalyst metal layer into a plurality of isolated fine particles; and a fourth step of subjecting the substrate supporting the plurality of fine particles to a carbon-containing gas atmosphere to grow the carbon nanotubes on the catalyst metal fine particles by a CVD method using the carbon-containing gas.

According to an second aspect of the present invention, a method of manufacturing carbon nanotubes, having a first step of forming an aluminum layer on a surface of a substrate and forming a natural oxidation film on a surface of the aluminum layer to form minute concavities and convexities at the surface, a second step of forming a catalyst metal layer having a film thickness of 0.1 to 0.6 nm on the natural oxidation film surface having the concavities and convexities, a third step of subjecting the substrate to a predetermined temperature to change the catalyst metal layer into a plurality of isolated fine particles, and a fourth step of subjecting the substrate supporting the plurality of fine particles to a carbon-containing gas atmosphere to grow the carbon nanotubes on the catalyst metal fine particles by a CVD method using the carbon-containing gas.

According to a third aspect of the present invention, a method of manufacturing carbon nanotubes, having a first step of forming minute concavities and convexities at a surface of a substrate, a second step of forming a catalyst metal layer having a predetermined film thickness on the surface having the concavities and convexities, a third step of forming an insulation layer having a groove on a surface of the substrate after the first step or on the catalyst metal layer after the second step, the groove having a predetermined width, extending in one direction, and exposing the surface of the substrate or the catalyst metal layer, a fourth step of subjecting the substrate to a heat treatment at a predetermined temperature to change the catalyst metal layer into a plurality of isolated fine particles, and a fifth step of subjecting the substrate supporting the plurality of fine particles to a carbon-containing gas atmosphere to grow the carbon nanotubes extending out of the groove along the surface of the insulating layer on the catalyst metal fine particles a CVD method using the carbon-containing gas.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

According to a method of manufacturing carbon nanotubes in this embodiment, a substrate is prepared that has a surface having concavities and convexities of a diameter of a few nanometers for example. Then, a catalyst metal layer of a few tenths of a nanometer is formed on the surface. Then, the substrate is subjected to a heat treatment to change the catalyst metal layer to a plurality of fine particles. Carbon nanotubes are grown on the catalyst metal of fine particles. The surface of the substrate and the catalyst metal has wetting properties by which the heat-treated catalyst metal is made of fine particles. By controlling the film thickness of the catalyst metal layer, the diameters of the fine particles separated by the concavities and convexities can be controlled. Thus, carbon nanotube grown on fine particles having a controlled diameter also can have a controlled diameter. Alternatively, carbon nanotubes also can have a controlled shell number by controlling the growth gas, even having same diameter. Thus, single-walled carbon nanotubes or double-walled carbon nanotubes can be generated with superior reproducibility.

[Steps of Manufacturing Carbon Nanotubes]

FIG. 1 is a cross-sectional view illustrating steps of manufacturing carbon nanotubes in this embodiment. Step of FIG. 1A generates an aluminum layer 12 of 5 nm to 200 nm (desirably about 5 nm) on the surface of a silicon substrate 10 by sputtering or evaporation. Then, the substrate having thereon the aluminum layer 12 is taken out of a growth chamber to subject the substrate to a room temperature atmosphere, thereby forming a natural oxidation film 14 of aluminum on the surface as shown in Step of FIG. 1B. The method of forming a natural oxidation film is not limited to the exposure to a room temperature atmosphere. Other methods also may be used such as the one for introducing oxygen into the chamber or the one for maintaining a low pressure in the chamber for a fixed period of time.

Figure 1A:
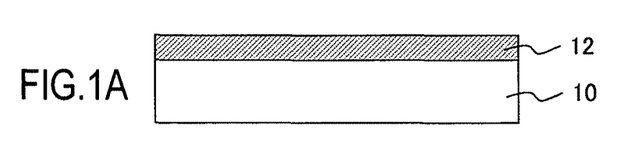
FIGS. 1A to 1E are cross-sectional views illustrating steps of manufacturing carbon nanotubes in this embodiment.
Figure 1B:
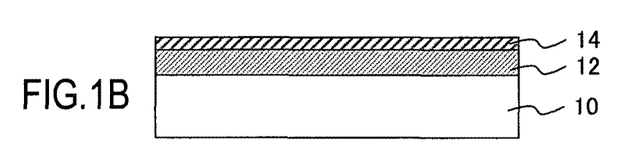
Figure 1C:
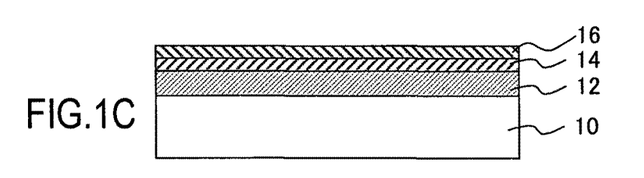
Figure 1D:
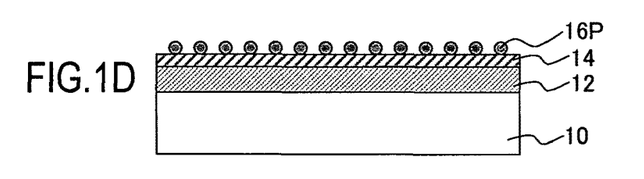

Next, as shown in Step of FIG. 1C, catalyst for growing carbon nanotubes, e.g. a layer 16 of transition metal including iron, cobalt, and nickel, is grown on the surface by sputtering to have a thin thickness of 0.1 to 0.6 nm for example. Then, as shown in Step of FIG. 1D, the substrate is placed in a vacuum furnace, e.g. $1 \times 1^{-3}$ Pa, to subject the substrate to a heat treatment at 450 to 650 degrees C., desirably 590 degrees C., to change the catalyst metal layer 16 into a plurality of fine particles 16P. The use of the catalyst layer having a film thickness of 0.4 nm unifies the diameter of the fine particles to about 2 nm. The formation of the fine particles is presumably realized by, as described later, a cyclic formation of minute concavities and convexities at the surface of the natural oxidation film 16 at the surface of the aluminum layer 12 to provide fine particles having a uniform diameter without causing the agglutination of fine particles obtained from the film-like layer by the heat treatment. The reduced heating temperature also avoids the further agglutination of fine particles. The same result is also obtained by continuously forming aluminum and transition metal films to heat the films under a low pressure atmosphere including sufficient oxygen.

Figure 1E:
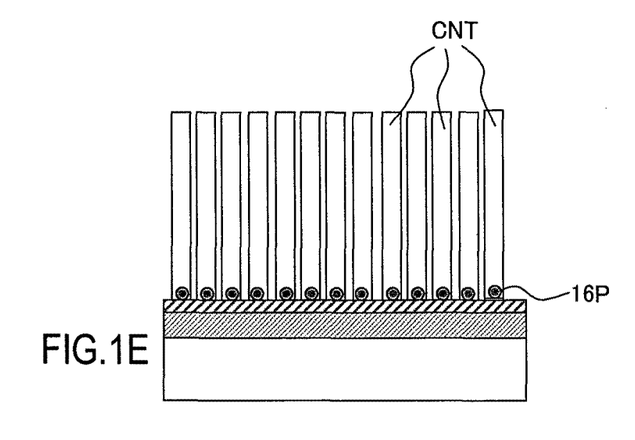

Then, as shown in Step of FIG. 1E, the substrate having the plurality of catalyst metal fine particles 16P on the surface is placed in the CVD chamber to grow carbon nanotubes (CNT) on the catalyst metal fine particles by CVD method of the growth gas obtained by mixing hydrogen (H2), hydrocarbon (preferably acetylene (C2H2), and argon (Ar). The unified diameter of the fine particles realizes the unified diameter of the carbon nanotubes. The above growth gas is not limited to hydrocarbon and also may be alcohol, carbon monoxide, or carbon dioxide.

Figure 2A:
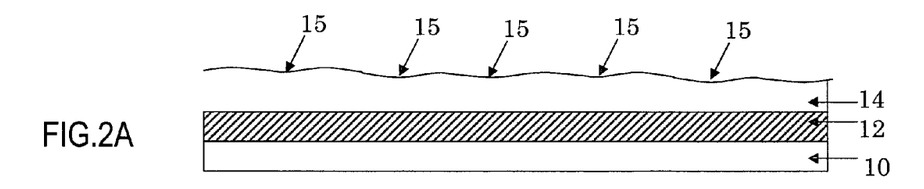
FIGS. 2A to 2D are cross-sectional views illustrating the formation of catalyst metal fine particles in this embodiment.

FIGS. 2A to 2D are cross-sectional views illustrating the formation of catalyst metal fine particles in this embodiment. FIG. 2A shows a status where Step of FIG. 1B is completed. In this status, the surface of the natural oxidation film 14 formed on the surface of the aluminum layer 12 has thereon minute concavities and convexities 15 due to the oxidation of the surface.

Figure 2B:
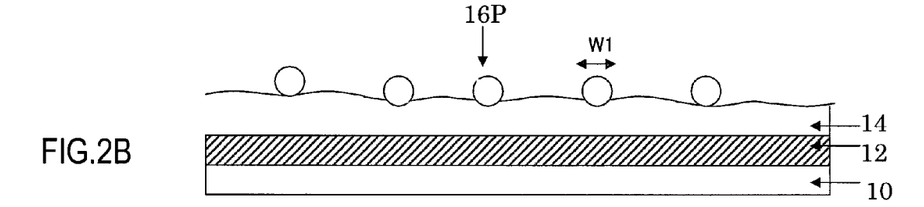

Thus, when the amount of the catalyst metal grown on the surface or the film thickness thereof is reduced, the catalyst metal melted through the subsequent heat treatment is agglutinated to a certain level but the agglutination is inhibited by the concavities and convexities 15, causing a plurality of isolated fine particles 16P as shown in the cross-sectional view of FIG. 2B. The catalyst metal layer having a thickness of about 0.4 nm for example causes generated fine particles 16P to have a controlled diameter W1 of about 2 nm. The catalyst metal layer having such a reduced thickness also always provides the generation of similar concavities and convexities on the surface of the natural oxidation film 14 and thus the fine particles 16P having a uniform diameter W1 can be generated with superior reproducibility.

Figure 2C:
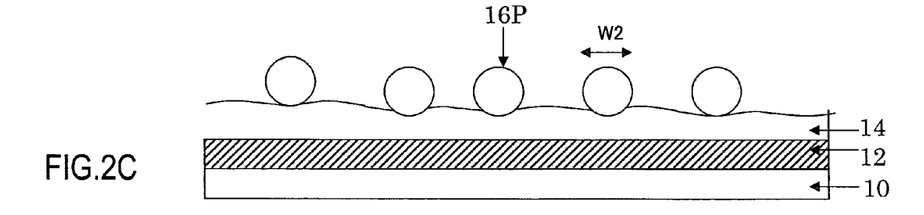
Figure 2D:
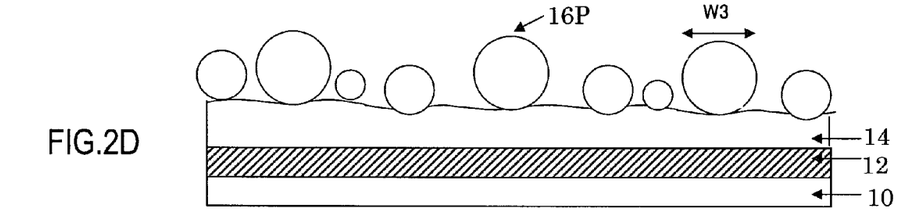

The increased amount of the catalyst metal grown on the surface of increased film thickness thereof also allows, as shown in the cross-sectional view of FIG. 2C, neighboring fine particles to be agglutinated to one another to change the catalyst metal into the fine particles 16P having a diameter W2 larger than the diameter W1 of FIG. 2B. A further increased amount of catalyst metal or further increased film thickness thereof promotes the further agglutination as shown in the cross-sectional view of FIG. 2D to change the catalyst metal into large fine particles 16P. At this stage, such fine particles that are not agglutinated with the large fine particles are also generated, failing to provide a uniform diameter distribution. A still further increased amount of catalyst metal or still further increased film thickness thereof prevents the fine particles 16P from being isolated from one another, thereby providing, even through a heat treatment, a film having a grain-like structure.

By controlling the amount of catalyst metal or film thickness thereof formed on the surface having cyclic concavities and convexities as described above, the diameter of the fine particles subjected to a heat treatment can be controlled with superior reproducibility. Thus, in this embodiment, a catalyst metal layer of about 0.4 nm is formed on the surface of the natural oxidation film of the aluminum layer, and the substrate is subject to a heat treatment at 590 degrees C. to form catalyst metal fine particles having a diameter of about 2 nm.

FIGS. 3A to 3D illustrate images observed by a scanning electron microscope (SEM image), obtained after subjecting to a heat treatment a substrate having catalyst metal on an aluminum layer. After depositing iron having thicknesses of (a) 0.2 nm, (b) 0.4 nm, (c) 1.0 nm, and (d)2.0 nm on aluminum layers (having a film thickness of 5 nm) having natural oxidation films thereon, the substrate is heated at 590 degrees C., and thereafter the images are taken by a scanning electron microscope (SEM image).

Figure 3A:
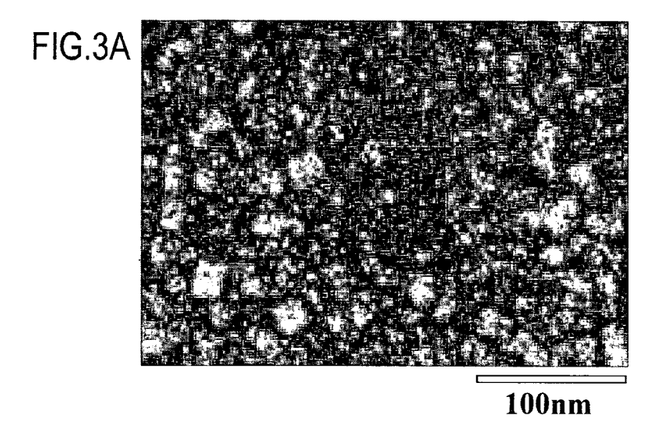
FIGS. 3A to 3D illustrate SEM images of carbon nanotubes grown in this embodiment.
Figure 3B:
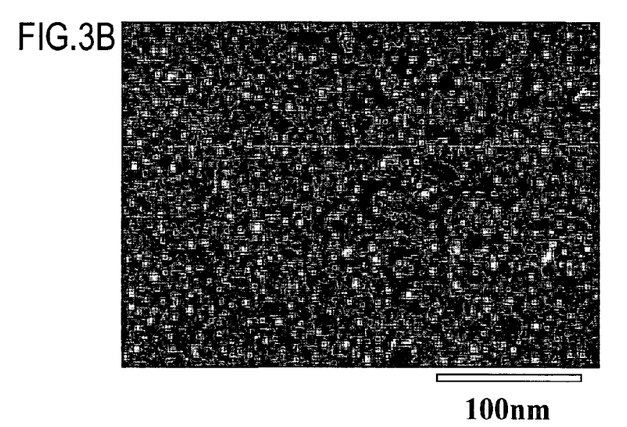
Figure 3C:
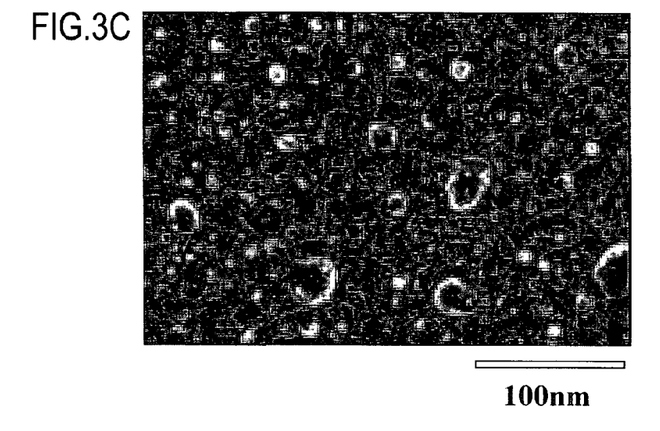
Figure 3D:
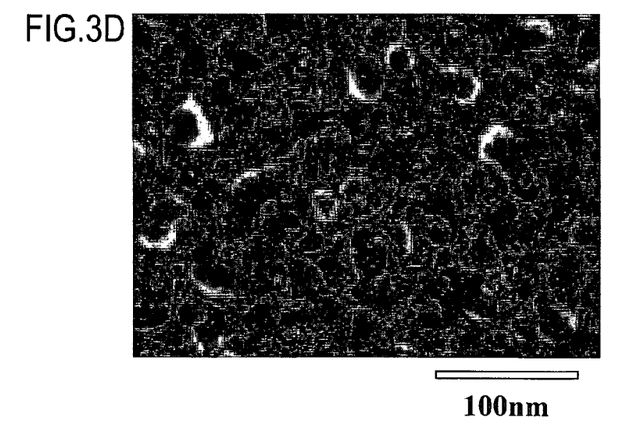

As can be seen in FIGS. 3A and 3B, iron fine particles are generated regularly that can be recognized as minute white spots. As can be seen from FIGS. 3C and 3D, larger iron fine particles are formed and the agglutination of fine particles causes uneven or sparse diameter distribution. Thus, an optimal thickness of the catalyst metal is 1 nm or less and about 0.1 to 0.6 nm. The iron fine particles were observed by a transmission electron microscope (TEM image). It was recognized that the fine particles of FIG. 3B had a diameter of about 2 nm. When fine particles having a uniform diameter distribution are not required, catalyst metal having a thickness of only about 1 nm may be enough to provide fine particles.

As described above, by controlling the thickness of the deposited catalyst metal layer, the diameter of the fine particles generated by a heat treatment can be controlled with superior reproducibility. Thus, catalyst metal particles having a uniform diameter can be formed easily, which is suitable for mass production.

[Manufacture Conditions of Carbon Nanotube]

Figure 4A:
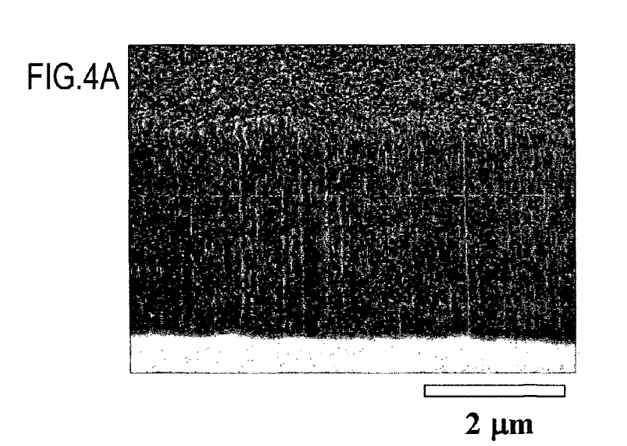
FIGS. 4A to 4C illustrate SEM images of carbon nanotubes grown in this embodiment.
Figure 4B:
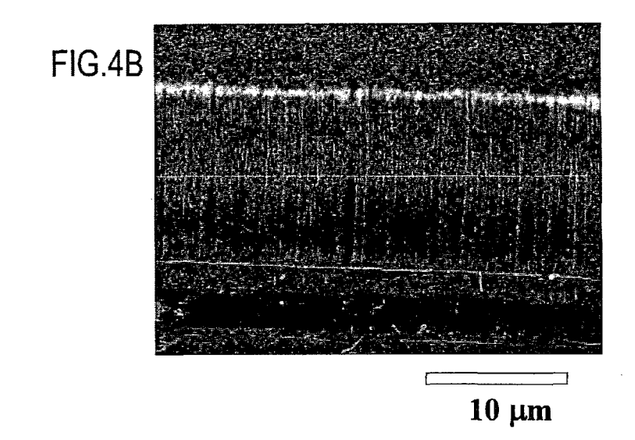
Figure 4C:
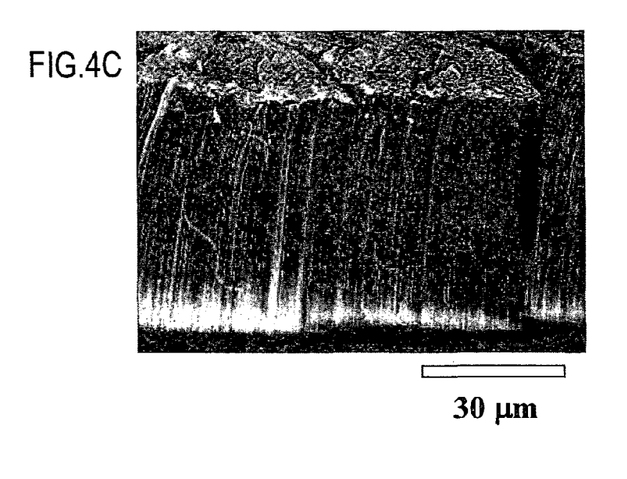

FIGS. 4A to 4C illustrate SEM images of carbon nanotubes grown in this embodiment. Samples are prepared by forming an aluminum layer having a film thickness of 5 nm on a silicon substrate, forming an iron layer having a film thickness of 0.4 nm thereon, subjecting the substrates to a heat treatment at 590 degrees C., and growing carbon nanotubes by the CVD method using the growth gas of hydrogen, acetylene, and argon. The three samples (a), (b), and (c) are different in the gas partial pressure of the growth gas of the CVD method as shown below.
Sample (a): Gas partial pressure is H2:C2H2/Ar=1995:5
Sample (b): Gas partial pressure is H2:C2H2/Ar=1950:50
Sample (c): Gas partial pressure is H2:C2H2/Ar=1800:200
The ratio of C2H2:Ar is 1:9 for any of the samples.

It is noted that acetylene C2H2 is to supply carbon, hydrogen H2 is to provide a reducing atmosphere to prevent the oxidation, and argon is inactive gas as carrier gas.

As can be seen from the SEM images of FIG. 4, carbon nanotubes having the same diameter can be grown densely. As shown by the scales in FIG. 4, even in the case of the carbon nanotube having the same diameter, the reduction in the amount of the acetylene gas as CVD growth gas causes the growth of shorter carbon nanotubes and the increase in the amount of the acetylene gas as CVD growth gas causes the growth of longer carbon nanotubes.

Figure 5A:
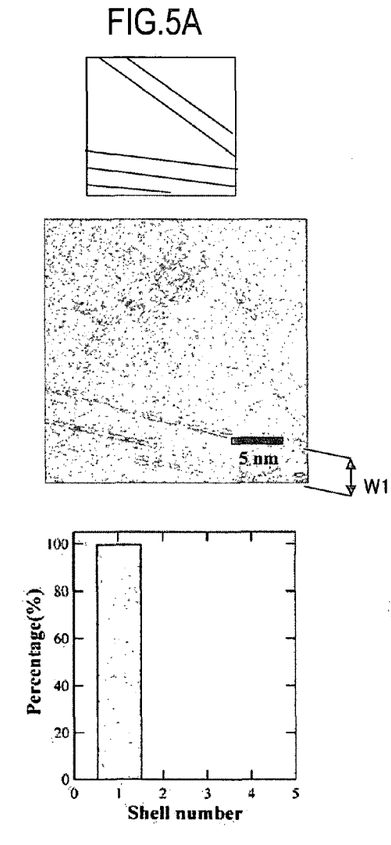
FIGS. 5A to 5C illustrate TEM images and shell number distributions of three samples of carbon nanotubes of FIG. 4.
Figure 5B:
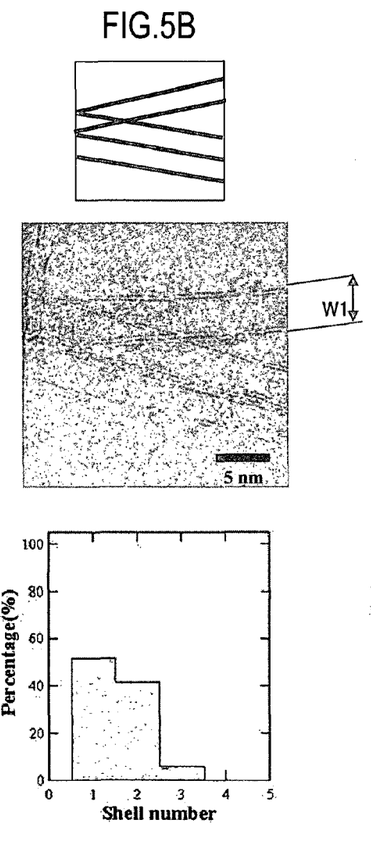
Figure 5C:
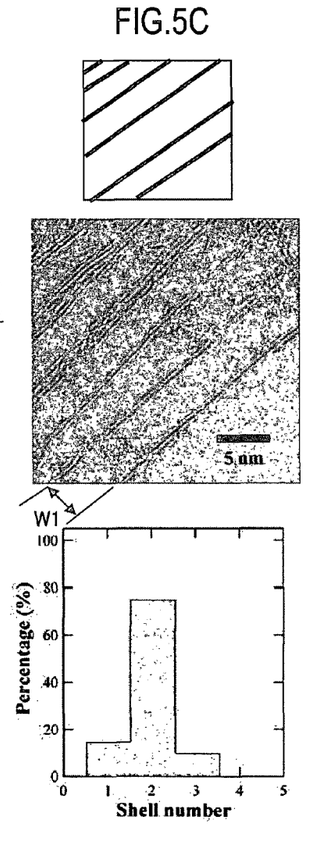

FIGS. 5A to 5C illustrate the TEM images and the shell number distribution of the three carbon nanotube samples of FIG. 4. The upper sides of FIGS. 5A to 5C show TEM images showing carbon nanotubes (schematic views of TEM images) and the lower sides thereof show the shell number distributions in which the horizontal axis shows the shell number and the vertical axis shows the ratio (%). In the case of the sample FIG. 5A, 100% of carbon nanotubes are grown as single-walled carbon nanotubes. As shown, the diameters W1 of the carbon nanotubes are about 4 nm in average although thinner nanotubes are also observed. In the case of the sample FIG. 5B, about a half of the grown carbon nanotubes are single-walled carbon nanotubes and the remaining half of the grown carbon nanotubes are double-walled carbon nanotubes. As shown, the diameters W1 of the carbon nanotubes are almost the same as those of the sample FIG. 5A. In the case of the sample FIG. 5C, almost all of the grown carbon nanotubes (about 80%) are double-walled carbon nanotubes. As shown, the diameters W1 of the carbon nanotubes are almost the same as those of the sample FIG. 5A and the sample FIG. 5B. Although not shown, when multi-walled carbon nanotubes are grown by the same samples, four-walled carbon nanotubes having a diameter of about 5 nm were grown. The gas partial pressure in this case was H2:C2H2/Ar=195:5.

As described above, when catalyst metal fine particles have a uniform diameter of about 2 nm, the partial pressure of carbon-containing gas (i.e., carbon hydride gas) of the growth gas for the carbon nanotubes can be controlled to distinctly grow single-walled carbon nanotubes and double-walled carbon nanotubes both having a uniform diameter, although these nanotubes have a larger size than the diameter of fine particles. Thus, the method for manufacturing carbon nanotubes suitable for mass-production can be provided.

The above tendency is also obtained when the film thickness of the catalyst metal is controlled to a reduced value (e.g., about 0.2 nm). Specifically, a control for providing a reduced partial pressure ratio of the carbon gas in the CVD growth gas for the carbon nanotubes can provide single-walled carbon nanotubes and a control for providing an increased partial pressure ratio of the carbon gas in the CVD growth gas for the carbon nanotubes can provide double-walled carbon nanotubes.

[Surface of Catalyst Metal Fine Particles]

In the above embodiment, an aluminum layer was formed on a silicon substrate, and the concavities and convexities of a natural oxidation film formed on the surface are used to miniaturize the catalyst metal. However, the invention is not limited to the natural oxidation film of the aluminum layer. Concavities and convexities at the surface of various substances can be used depending on the compatibility with the catalyst metal, e.g. surface tension.

Figure 6A:
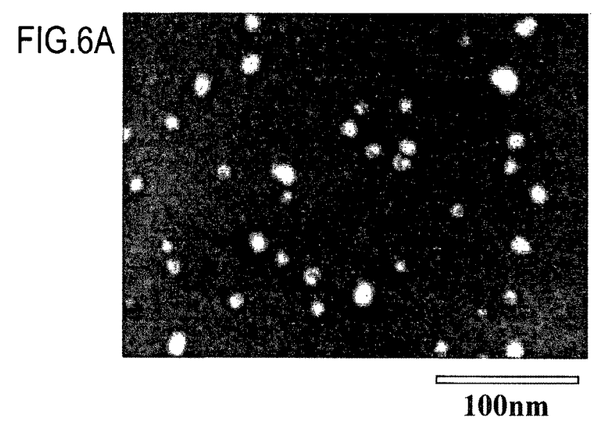
FIGS. 6A to 6C illustrate SEM images showing catalyst metal fine particles on an aluminum layer and catalyst metal fine particles on a silicon substrate.
Figure 6B:
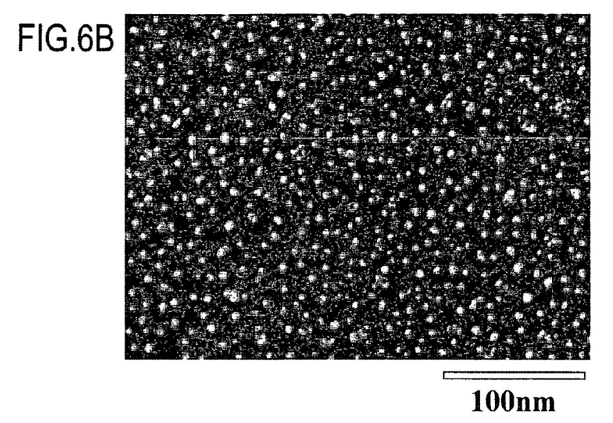
Figure 6C:
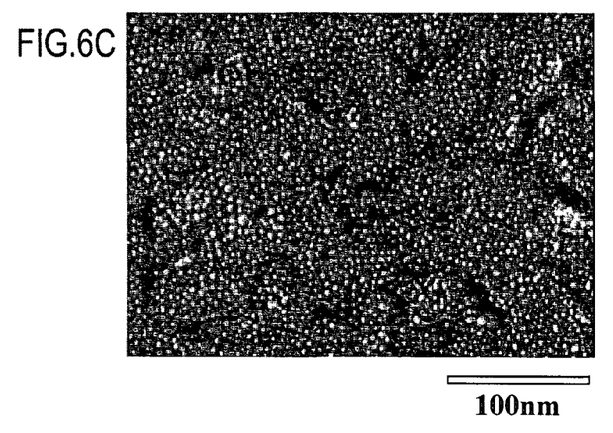

FIGS. 6A to 6C illustrate SEM images showing catalyst metal fine particles on the aluminum layer and catalyst metal fine particles on the silicon substrate. The sample FIG. 6A is obtained by depositing iron on the surface of the silicon substrate to a thickness of 0.4 nm and subjecting the substrate to a heat treatment. The sample FIG. 6A shows no uniform fine particles of white spots. This shows that iron on the silicon surface is formed into fine particles by the heat treatment but the nonexistence of minute concavities and convexities as in the aluminum natural oxidation film causes the fine particles to be agglutinated to one another to fail to provide a uniform diameter. The sample FIG. 6B is obtained by growing cobalt on the surface of the silicon substrate to a thickness of 0.4 nm and subjecting the substrate to a heat treatment. The sample FIG. 6B shows fine particles of white spots that are uniform to a certain level but that have not-so-minute diameters. The sample FIG. 6C is obtained by growing cobalt on the surface of the silicon substrate to a thickness of 0.4 nm and subjecting the substrate to a heat treatment. The sample FIG. 6C shows fine particles of white spots that are uniform and minute.

Although not shown, it was observed that samples similarly obtained by depositing nickel on the aluminum layer surface and the surface of the silicon substrate both resulted in uniform and minute particles. This is presumably due to that nickel has a different surface tension to the silicon substrate from those of iron and cobalt, and thus is suppressed from being agglutinated to one another.

As described above, the concavities and convexities at the surfaces of various materials can be used to provide catalyst metal fine particles. Thus, it is desirable that concavities and convexities at the surface of material are appropriately selected depending on the wetting property of the catalyst metal.

[Steps of Manufacturing Carbon Nanotubes that can be Used for Device]

By using the technique for providing catalyst metal fine particles in this embodiment, carbon nanotubes having a desired diameter and a desired shell number can be grown on a substrate with superior reproducibility. The following section will describe steps of manufacturing carbon nanotubes that can be used for an electronic device.

FIGS. 7A to 7F are cross-sectional views illustrating steps of manufacturing carbon nanotubes that can be used for a device. Step FIG. 7A forms the aluminum layer 12 having a thickness of about 5 nm on the silicon substrate 10 and a not-shown natural oxidation film is formed on the surface. In step FIG. 7B, a silicon oxidation film 20 having a thickness of about 400 μm is formed on the aluminum layer 12, a stripe-like opening section (groove section) 22 is formed according to a known lithography technique, and the aluminum layer 12 is removed by etching through the opening section 22 as a mask.

Figure 7A:
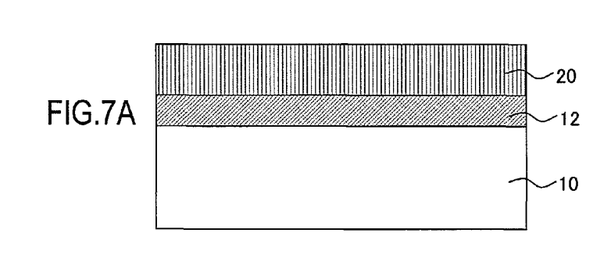
FIGS. 7A to 7F are cross-sectional views illustrating steps of manufacturing carbon nanotubes that can be used for a device.
Figure 7B:
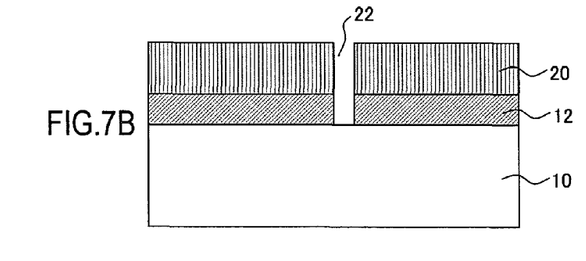
Figure 7C:
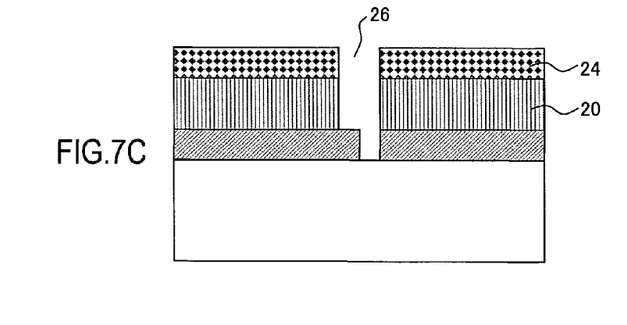
Figure 7D:
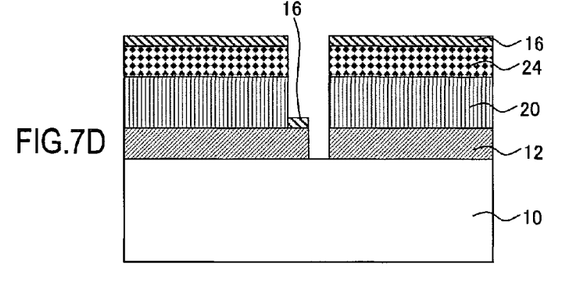

Then, as shown in Step FIG. 7C, a resist layer 24 is formed on the silicon oxidation film 20 to form a stripe-like opening section 26 wider than the opening section 22, and the silicon oxidation film 20 is removed by etching by using the opening section 26 as a mask. Then, as shown in Step FIG. 7D, the catalyst metal layer 16 of iron is formed over the entire surface. This results in the catalyst metal layer 16 formed on the surface of the aluminum layer 12 in the opening section.

Figure 7E:
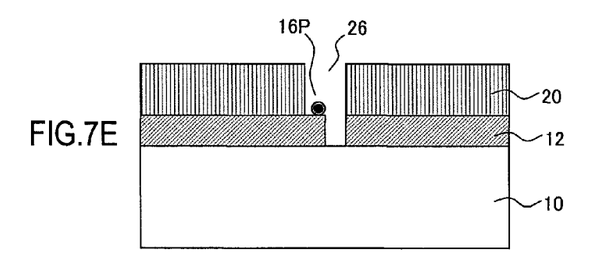
Figure 7F:
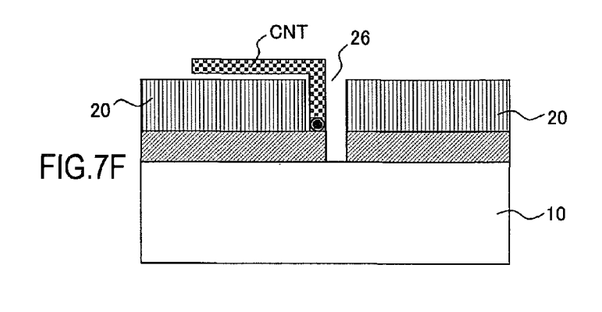

Then, as shown in Step FIG. 7E, the resist layer 24 at the surface is removed to also lift off the catalyst metal layer 16 on the resist layer, subsequently a heat treatment is carried out at about 590 degrees C. to change the catalyst metal layer on aluminum the layer 16 into the fine particles 16P. This can provide uniform iron catalyst metal fine particles 16P formed in a groove section 26 extending in one direction. Thereafter, the substrate is transported into a CVD chamber to grow carbon nanotubes in the above-described growth gas atmosphere. As a result, as shown in FIG. 7F, carbon nanotube CNT is grown on the catalyst metal particles 16P as shown and the grown carbon nanotube CNT is formed to be bent to the surface of the silicon oxidation film 20. This growth method is described, for example, in Abstract of "6th International Conference on the Science an Application of Nanotubes" (p. 63 (2005)).

In the above manufacture steps, the catalyst metal layer also may be formed on the aluminum layer 12 in Step FIG. 7A. In this case, the formation step of the catalyst metal layer in Step FIG. 7D and the lift-off step are not required.

Figure 8:
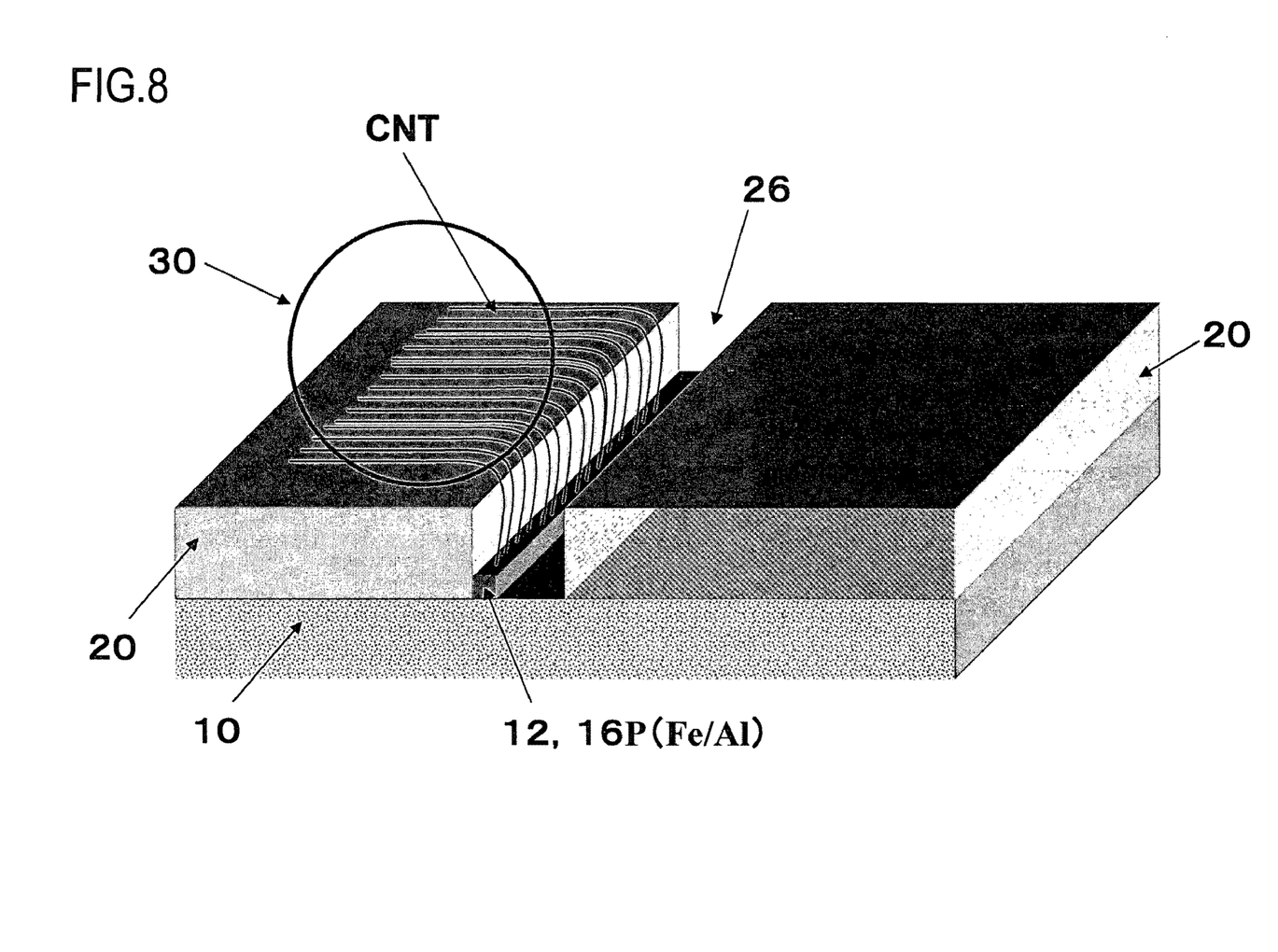
FIG. 8 is a perspective view illustrating a substrate on which a plurality of carbon nanotubes is generated through FIG. 7.

FIG. 8 is a perspective view illustrating a substrate on which a plurality of carbon nanotubes is generated through FIG. 7. The insulating layer 20 having the groove section 26 of about 400 μm is formed on the silicon substrate 10. The groove section 26 includes therein an aluminum layer 12 and fine particles 16P formed on the aluminum layer. The carbon nanotubes CNT having a desired diameter and shell number are grown on the fine particles 16P and are arranged on the silicon oxidation film 20. As shown in the circle 30 in FIG. 8, the plurality of carbon nanotubes CNT are formed and arranged on the insulating layer consisting of the silicon oxidation film.

By controlling the carbon nanotubes CNT to have a desired diameter and a double-walled structure, a field-effect transistor can be formed in which the first layer of the carbon nanotubes functions as a channel region and the second layer functions as a protection film. For example, the field-effect transistor as disclosed in WO 02/063693A1 can be formed in a plurality of numbers.

According to the present invention, catalyst metal fine particles functioning as a core of the growth of carbon nanotubes can be formed, with superior reproducibility, with uniform distribution and a uniform particle diameter. By employing the resultant catalyst metal fine particles and by controlling growth gas components of the CVD method, carbon nanotubes having a uniform diameter and a desired shell number can be grown. Thus, a method can be provided to manufacture carbon nanotubes that are suitable for an electronic device and a sensor using carbon nanotubes.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing the superiority and inferiority of the invention. Although the embodiments of the present inventions have been described in detail, it should be understood that the various changes, substitutions, and alterations could be made hereto without departing from the spirit and scope of the invention.

What we claims are:

1. A method of manufacturing carbon nanotubes, comprising:
    a first step of forming an aluminum layer on a surface of a substrate, and forming a natural oxidation film on a surface of the aluminum layer to form minute concavities and convexities at a surface of the natural oxidation film;
    a second step of forming a catalyst metal layer having a film thickness of 0.2 nm-0.4 nm on the natural oxidation film surface having the concavities and convexities;
    a third step of subjecting the substrate to a heat treatment to change the catalyst metal layer into a plurality of isolated fine particles;
    a fourth step of subjecting the substrate supporting the plurality of fine particles to a carbon-containing gas atmosphere to grow the carbon nanotubes on the catalyst metal fine particles by a CVD method using the carbon-containing gas; and,
    wherein an agglutination of the isolated fine particles is inhibited by the concavities and convexities of the natural oxidation film during the heat treatment.

2. The method of manufacturing carbon nanotubes according to claim 1, wherein:
    the catalyst metal layer of the second step is made of transition metal at least including iron, cobalt, and nickel.

3. The method of manufacturing carbon nanotubes according to claim 1, wherein:
    the first step has a step of preparing a silicon substrate as the substrate, wherein the minute concavities and convexities is formed at a surface of the silicon substrate, and
    the catalyst metal layer of the second step is made of nickel.

4. The method of manufacturing carbon nanotubes according to claim 1, wherein:
    the carbon-containing gas in the fifth step includes first gas that is any of hydrocarbon including at least methane, acetylene, and butane, alcohol, carbon monoxide, carbon dioxide, or hydrogen gas,
    the first gas is controlled to be in a first amount to generate single-walled carbon nanotubes or the first gas is controlled to be in a second amount larger than the first amount to generate double-walled carbon nanotubes.

5. The method of manufacturing carbon nanotubes according to claim 1, wherein the plurality of isolated fine particles are generated uniformly.

6. The method of manufacturing carbon nanotubes according to claim 1, wherein the isolated fine particles have a uniform diameter of about 2 nm.

7. A method of manufacturing carbon nanotubes according to claim 1, wherein the third step includes subjecting the substrate to a temperature between 450 and 590 degrees Celsius in a vacuum to change the catalyst metal layer into a plurality of isolated fine particles.

8. A method of manufacturing carbon nanotubes, comprising:
- a first step of forming minute concavities and convexities at a surface of a substrate;
- a second step of forming a catalyst metal layer having a predetermined film thickness on the surface having the concavities and convexities;
- a third step of forming a groove on a surface of the substrate after the first step or on the catalyst metal layer after the second step, wherein the groove has a predetermined width, extends in one direction, and exposes the surface of the substrate or the catalyst metal layer;
- a fourth step of subjecting the substrate to a heat treatment at a predetermined temperature to change the catalyst metal layer into a plurality of isolated fine particles;
- a fifth step of subjecting the substrate supporting the plurality of fine particles to a carbon-containing gas atmosphere to grow the carbon nanotubes extending out of the groove along the surface of the insulating layer onto the catalyst metal fine particles by a CVD method using the carbon-containing gas;
- the predetermined film thickness of the catalyst metal in the second step is 0.2 nm-0.4 nm and the predetermined temperature of the heat treatment of the third step is 450° C. to 650° C. ;
- wherein in the first step, an aluminum layer is formed on the substrate, and a natural oxidation film is formed on a surface of the aluminum layer to form the minute concavities and convexities at the natural oxidation film; and,
- wherein an agglutination of the isolated fine particles is inhibited by the concavities and convexities of the natural oxidation film during the heat treatment.

9. The method of manufacturing carbon nanotubes according to claim 8, wherein:
the catalyst metal layer of the second step is made of transition metal at least including iron, cobalt, and nickel.

10. The method of manufacturing carbon nanotubes according to claim 8, wherein:
the first step has a step of preparing a silicon substrate as the substrate, wherein the minute concavities and convexities is formed at a surface of the silicon substrate, and
the catalyst metal layer of the second step is made of nickel.

11. The method of manufacturing carbon nanotubes according to claim 8, wherein:
in the second step, the catalyst metal layer is controlled to have a first film thickness, and in the fourth step, the fine particles are controlled to have a first diameter, or
in the second step, the catalyst metal layer is controlled to have a second film thickness thicker than the first film thickness, and in the fourth step, fine particles is controlled to have a second diameter larger than the first diameter.

12. The method of manufacturing carbon nanotubes according to claim 8, wherein
the carbon-containing gas in the fifth step includes first gas that is any of hydrocarbon including at least methane, acetylene, and butane, alcohol, carbon monoxide, carbon dioxide, or hydrogen gas,
the first gas is controlled to be in a second amount larger than a first amount for generating single-walled carbon nanotubes, to generate double-walled carbon nanotubes.

13. The method of manufacturing carbon nanotubes according to claim 8, wherein the isolated fine particles have a uniform diameter of about 2 nm.

* * * * *